(12) United States Patent
Hale et al.

(10) Patent No.: US 7,671,945 B2
(45) Date of Patent: Mar. 2, 2010

(54) UV CURABLE ALIGNMENT MATERIAL FOR FABRICATION OF MONOLITHIC COMPENSATORS FOR LIQUID CRYSTAL DISPLAYS

(75) Inventors: Leonard G. Hale, Cambria, CA (US); Young J. Chung, Calabasas, CA (US); William J. Gunning, III, Newbury Park, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 766 days.

(21) Appl. No.: 11/434,641

(22) Filed: May 15, 2006

(65) Prior Publication Data

US 2007/0085951 A1    Apr. 19, 2007

Related U.S. Application Data

(63) Continuation-in-part of application No. 11/241,070, filed on Sep. 30, 2005, now Pat. No. 7,515,231.

(51) Int. Cl.
*G02F 1/1335* (2006.01)
(52) U.S. Cl. .................. 349/117; 349/123; 349/126; 349/86; 349/179
(58) Field of Classification Search ............ 349/117, 349/119, 120, 127, 96, 179, 123, 126, 88, 349/86
See application file for complete search history.

(56) References Cited

U.S. PATENT DOCUMENTS

| | | | |
|---|---|---|---|
| 5,196,953 A | 3/1993 | Yeh et al. | 359/73 |
| 5,480,964 A | 1/1996 | Harris et al. | 528/353 |
| 5,504,603 A | 4/1996 | Winker et al. | 359/73 |
| 5,557,434 A | 9/1996 | Winker et al. | 359/73 |
| 5,589,963 A | 12/1996 | Gunning, III et al. | 349/119 |
| 5,612,801 A | 3/1997 | Winker | 349/119 |
| 5,619,352 A | 4/1997 | Koch et al. | 349/89 |
| 5,638,197 A | 6/1997 | Gunning, III et al. | 349/96 |
| 5,731,886 A | 3/1998 | Taber et al. | 359/65 |
| 5,926,241 A * | 7/1999 | Gunning, III | 349/117 |
| 5,986,734 A | 11/1999 | Winker et al. | 349/123 |
| 5,995,184 A | 11/1999 | Chung et al. | 349/118 |
| 6,320,634 B1 | 11/2001 | Winker et al. | 349/117 |
| 6,599,443 B1 | 7/2003 | Sharples et al. | 252/299.63 |
| 6,841,654 B2 | 1/2005 | Gu et al. | 528/393 |
| 7,215,839 B2 * | 5/2007 | Kawahara et al. | 385/11 |

(Continued)

OTHER PUBLICATIONS

Li et al.; "Polyimide films as negative birefringent compensators for normally white twisted nematic liquid crystal displays"; Polymer; vol. 37 No. 23; 1996; pp. 5321-5325.

*Primary Examiner*—Thoi V Duong
(74) *Attorney, Agent, or Firm*—Koppel, Patrick, Heybl & Dawson (57) ABSTRACT

A segmented, rigid-rod aromatic polyimide mixed with a UV curable acrylate photopolymer material comprises an alignment layer for aligning nematic polymeric liquid crystal compensator films. The material may also provide an out-of-plane retardation. The segmented, rigid-rod aromatic polyimide-based UV curable acrylate alignment layer, when applied in appropriate thickness, functions as a negative uniaxial C-plate compensator and causes alignment of the nematic liquid crystal molecules. The combination of the retardation provided by the alignment layer and the compensator film deposited on it provides a significant improvement in the contrast and color stability of liquid crystal displays (LCDs) at large viewing angles.

56 Claims, 7 Drawing Sheets

U.S. PATENT DOCUMENTS 7,301,594 B2 * 11/2007 Yu et al. .................... 349/120
7,387,857 B2 * 6/2008 Oomori et al. ................ 430/20
2005/0134774 A1 6/2005 Coates et al.
2006/0055855 A1 * 3/2006 Duz et al. .................. 349/117

* cited by examiner

UV CURABLE ALIGNMENT MATERIAL FOR FABRICATION OF MONOLITHIC COMPENSATORS FOR LIQUID CRYSTAL DISPLAYS

CROSS REFERENCE TO RELATED APPLICATION

This application is a continuation-in-part of U.S. patent application Ser. No. 11/241,070, filed Sep. 30, 2005 now U.S. Pat. No. 7,515,231 and titled "New Low Temperature Low Cost Liquid Crystal Alignment Material"; that application is incorporated herein by reference.

FIELD OF THE INVENTION

The present invention relates generally to liquid crystal displays (LCDs) and particularly to alignment layers or films for use in such displays.

BACKGROUND

Liquid crystal displays (LCDs) are used to display information by utilizing the effect that the optical birefringence of the liquid crystal layer has on the polarization of light that is transmitted through said layer. By applying a voltage across the liquid crystal layer, the orientation of the liquid crystal molecules is modified, changing the optical symmetry and hence optical retardation of the liquid crystal layer. This in turn modifies the polarization of the transmitted light. When the liquid crystal layer is positioned between two polarizing films, the change in polarization of the transmitted light is resolved into a difference in transmitted intensity. In this way, information is displayed on a liquid crystal display by spatially modulating the voltage on the liquid crystal, effectively changing individual spatial elements, or pixels, from transmitting to blocking the incident light. Liquid crystal displays are made in a multitude of configurations including transmissive, being illuminated from behind by a separate light source, and reflective, whereby the ambient light that is incident on the front of the display is reflected by a layer behind the liquid crystal and intensity resolved upon passing through the single entrance/exit polarizer on the viewing surface. Liquid crystal displays have advantages over other display media in that they can display information with much lower power consumption than emissive displays, such as plasma displays. Thus, LCDs are used in display devices such as wristwatches, pocket and personal computers, calculators, aircraft cockpit displays, etc. The very long operational life in combination with very low weight and low power consumption of LCDs, along with other design advantages, have particular utility in these applications. See U.S. Pat. No. 5,612,801, incorporated herein by reference, for an overview of LCD technology.

Liquid crystal displays exist in a multitude of embodiments depending upon the specific type of liquid crystal material and the configuration of the polarizers and electrodes. In its simplest form, a typical LCD comprises a liquid crystal cell, situated between two polarizer layers, the second polarizer layer commonly referred to as the analyzer layer. Many such liquid crystal displays exhibit optical performance that is very sensitive to the angle at which the display is viewed. Contrast, gray level separation, and color often change significantly as the viewing angle deviates from normal, or zero degrees. This viewing angle behavior arises because the optical symmetry of the liquid crystal layer is such that when the liquid crystal is electrically aligned to produce a specific transmission level at normal viewing, the angle dependence of the optical retardation through the liquid crystal layer causes the transmission at off-normal viewing to be either higher or lower than the commanded transmission at zero degrees. This can severely limit the use of LCDs in many desirable applications. Optical compensation films, also referred to as compensators or retarders, are commonly used to mitigate the viewing angle effects in LCDs, the specific design and geometry being dependent on the type of LCD employed.

A retarder, or compensator, denotes a film or plate-like birefringent optical element for which the refractive index along at least one of the optical axes is different from the other two. If the three refractive indices are different the material is called biaxial. If two of the indices are the same with the third being different the material is uniaxial. Further, a uniaxial material can have either positive or negative birefringence depending on whether the refractive index for light polarized normal to the uniaxial optical axis is less than or greater than the refractive index for light that has a polarization component parallel to the optical axis respectively.

In the ideal case, an optical compensator is designed to have an angle dependence that is complementary to that of the liquid crystal layer, thus canceling, or compensating for the angle dependence of the liquid crystal. The angle dependence is not exactly complementary because the symmetry of the liquid crystal film varies as it is electrically driven to its various transmission state orientations. The objective of a compensator design is to provide the best overall optical effect throughout the full transmission range of the liquid crystal display. The uses of such compensators have been disclosed in U.S. Pat. No. 5,196,953 (Yeh et al.), U.S. Pat. No. 5,504,603 (Winker et al.), U.S. Pat. No. 5,557,434 (Winker et al.), U.S. Pat. No. 5,589,963 (Gunning, III et al.), U.S. Pat. No. 5,619,352 (Koch et al.), U.S. Pat. No. 5,612,801 (Winker) and U.S. Pat. No. 5,638,197 (Gunning, III et al.), all of which are incorporated herein by reference.

Compensators may be placed between the polarizer and the liquid crystal cell, between the analyzer and the liquid crystal cell, or in both locations. With the addition of one or more compensator layers, the contrast ratio and grey level stability is improved over a wide range of viewing angles by careful design so the compensator, which may include multiple layers of birefringent materials each having different thicknesses, optical axis orientation with respect to the liquid crystal and polarizer angles, or sign of birefringence.

Figures 1, 3, 4, 15:
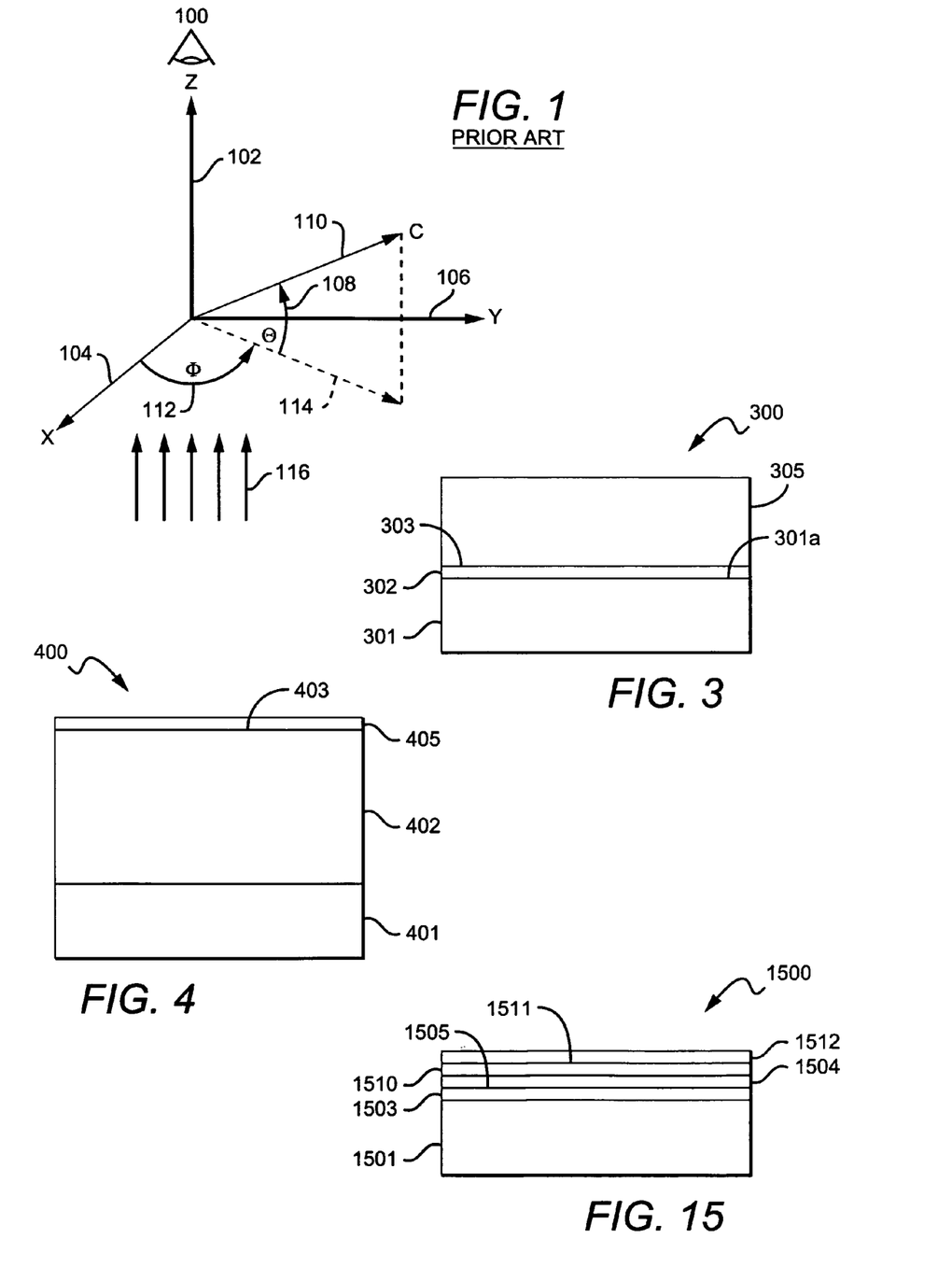
FIG. 1 depicts a three-dimensional coordinate system that is used to specify component orientations in the description of this invention.
FIG. 3 is a simplified cross sectional view of a compensator structure in accordance with one embodiment of the invention wherein the aromatic polyimide-based UV curable acrylate acts as an alignment layer only.
FIG. 4 is a simplified cross sectional view of a compensator structure in accordance with another embodiment of the invention wherein the aromatic polyimide-based UV curable acrylate layer serves as an alignment layer for the polymerized liquid crystal compensator films as well as a negative birefringent C-plate compensator layer.
FIG. 15 is a simplified cross sectional view of a multilayer polymerized liquid crystal compensator structure fabricated using aromatic polyimide-based acrylate alignment films in accordance with embodiments of the invention.

FIG. 1 depicts a coordinate system, which is used to describe the orientation of both liquid crystal and birefringent compensator optic axes. Light 116 propagates toward the viewer 100 in the positive z direction 102, which, together with the x-axis 104 and the y-axis 106, forms a right-handed coordinate system. The polar tilt angle θ (108) is defined as the angle between the liquid crystal molecular optic axis (c-axis) 110 and the x-y plane, measured from the x-y plane. The azimuthal angle φ (112) is measured from the x-axis to the projection 114 of the optic axis onto the x-y plane.

Compensator films comprise either stretched films of polymer materials, or coated films of materials having significant optical anisotropy. Stretched polymer films typically are made from polyvinyl alcohol, polystyrene, or polycarbonate. Stretched PVA films have an optical axis orientation in the stretch direction, parallel to the surface of the film, and exhibit positive birefringence. Other materials have similar in-plane optical axis orientation but with a negative birefringence. This in-plane optical symmetry is commonly referred to as "A-plate". Stretched films are widely used but suffer from retardation non-uniformity and are affected by high temperatures which may be encountered in certain display applications. They are also limited in the range of achievable optical symmetries and therefore cannot adequately address the requirements of many high performance LCDs.

An alternative approach for LCD compensation films uses films of polymerized liquid crystals. These may be films of liquid crystal polymers that are melt cast onto a suitable substrate, which then solidify upon cooling, or films of polymerizable liquid crystal materials, commonly described as reactive mesogens, provided in a solvent and formed into films, dried, and then polymerized either using photo polymerization or thermal polymerization. The liquid crystal films may consist of nematic (rod-like) liquid crystal molecules, having positive birefringence, or discotic (disk-shaped) liquid crystals, having negative birefringence. The substrates for these films are prepared by various means to induce the desired alignment or orientation of the liquid crystal molecules in the film. The most common method for achieving this alignment is to gently rub the surface of a suitable alignment layer using a rayon cloth. Alternatively, alignment may be induced by photo alignment of a suitable photo-active alignment layer where a preferred orientation direction is imparted through the interaction with linearly polarized ultraviolet light. Further, the liquid crystal coating solution may also be modified to provide a range of optical symmetries within the liquid crystal layer, for example by the addition of a chiral component to a nematic solution to produce a twist in the orientation of the molecules in the film or to modify the orientation of the liquid crystal at the air interface.

Liquid crystal films may have a multitude of optical symmetries. For example, nematic films may be formed in the following symmetries:

For an A-plate the liquid crystal molecules are all oriented parallel to each other and substantially in the plane of the film, the direction of the long axes of the molecules determining the optical axis direction. There may be a very small tilt of a few degrees between the substrate and the first few layers of molecules, but the molecules at the air interface are oriented substantially parallel to the interface.

O-plate compensator films are formed using nematic liquid crystals, but the average value of the angle of the optical axis with respect to the surface is usually substantial, ranging from 25 to 60 degrees. The term O-plate refers to this oblique orientation of the optical axis.

O-plates may have several geometries. They may include configurations where the orientation of the optical axis is substantially constant throughout its thickness. Splayed O-plates have a varying tilt, ranging from a few degrees at the alignment surface to some steeper angle at the air interface that can be as great as 90 degrees. Finally, chiral additives may be included in the coating formulation so that the orientation of the liquid crystals develops a thickness dependent twist in combination with a constant or splayed tilt. Reference herein to "O-plates" can include all of these variations.

Discotic liquid crystal films form via the stacking of negatively birefringent disc shaped liquid crystal molecules. Discotic films occur in various configurations, including uniformly stacked discotic molecules with no tilt between the substrate and the air interface (referred to as a C-plate orientation), or alternatively, in splay configurations where the tilt of the molecules varies from a few degrees at the substrate to nearly 90 degrees at the air interface.

C-plate compensators are films having their optical axes normal to the surface. Most C-plate compensators that are commonly in use for LCDs have negative birefringence. They may include films formed using discotic liquid crystals that are aligned to have uniform orientation throughout the film thickness, films of segmented, rigid rod polyimide materials, biaxially stretched films of polystyrene, thick layers of cellulose triacetate (TAC), or multilayer structures of very thin alternating high and low refractive index materials. Negative birefringent C-plate films are useful as components in compensators for TN, VA and other display types and may be used alone or in combination with other compensation films.

An important characteristic of a liquid crystal alignment film is its ability to readily orient the liquid crystal film in a specific direction, and also to generate a "pretilt" for the aligned liquid crystal. Referring to FIG. 1, pretilt refers to a slight out-of-plane orientation of the liquid crystal molecules, typically a few degrees. For films of nematic liquid crystal materials, a pretilt of several degrees is required to insure that the liquid crystal molecules all orient with their tilt in the same direction (particularly for O-plate, splay O-plates, and twisted O-plate films). Without sufficient pretilt, a liquid crystal film will form with multiple domains and make the film ineffective for compensating a liquid crystal display. Pretilt may not be necessary for A-plates. Polyimide films are common alignment materials used with nematic liquid crystal films and are the primary material used as an alignment film for liquid crystals within the active cell of a liquid crystal display.

Most liquid crystal compensators incorporate an alignment layer coated onto a transparent substrate. Typical transparent substrates are polycarbonate or TAC. Polycarbonate can withstand higher temperatures but is expensive. TAC is less expensive and is the preferred material for most production applications. However, because the acceptable process temperature for TAC is limited by the possibility of heat deformation of the substrate, limits are imposed on the type of alignment materials and the process conditions that may be used such as drying method and temperature. Standard polyimide alignment materials typically require a high curing temperature and are therefore preferably avoided. In addition, the solvents used with most polyimide alignment layers will damage the underlying TAC substrate.

SUMMARY OF THE INVENTION

In accordance with one exemplary aspect of the present invention, there is provided an alignment material comprising a UV curable acrylate photopolymer and a segmented, rigid-rod aromatic polyimide. The particular polyimide preferably has the ability to form films having a negative birefringence and C-plate optical symmetry. Further, rubbing a surface of the film renders it capable of aligning nematic liquid crystal molecules in a film on the alignment layer with pretilt for use as a compensator film. This material can be used as the alignment layer for the fabrication of compensator assemblies, such as combinations of O-plate, splayed O-plate, splay/twist-O-plate and A-plate compensators. One feature of the alignment material is that it is not damaged by the solvents used in polymeric nematic liquid crystal compensators. The aromatic polyimide material by itself is dissolved by these organic solvents. The UV curable acrylate photopolymer by itself does not provide alignment for the liquid crystal molecules. This material may also be used for aligning cholesteric films and may be used as alignment layers for the liquid crystal material within the active cells of nematic liquid crystal based liquid crystal displays. This material is capable of aligning a nematic liquid crystal with sufficient pretilt to enable single-domain liquid crystal-based compensation films.

An additional feature of embodiments of the present invention is that when the segmented, rigid-rod aromatic polyimide material is so modified it may be used as an alignment layer while maintaining its negative C-plate characteristic. This may be accomplished by adding an ultraviolet-curable resin to a conventional segmented rigid-rod aromatic polyimide material. After UV curing, the resin-hardened aromatic polyimide material may be rubbed and a liquid crystal compensator film coated on top of the aromatic polyimide. Thus, in accordance with another aspect of the invention, the new aromatic polyimide material enables a liquid crystal film to be solvent coated thereon without the liquid crystal film solvent dissolving the hardened aromatic polyimide film. Combining the aromatic polyimide-based UV curable acrylate alignment layer with a polymerized liquid crystal A-plate film results in a film having optical compensation characteristics equivalent to those of a biaxial compensator that is effective in improving the viewing angle properties of LCDs. Advantageously, by combining the alignment and C-plate functions into a single layer, the invention eliminates the separate alignment layer used in conventional structures comprising three or more layers resulting in substantial cost savings.

The out-of-plane negative uniaxial birefringence of an alignment film in accordance with the invention produces a retardation of appropriately 50 nm for each 1 µm of physical thickness. Film thicknesses of approximately 0.3 to 10 microns are readily achieved in thin film processing. Therefore, one can pick the retardation desired for an assembly by varying the thickness of the polyimide film. The aromatic polyimide-based UV curable acrylate film of sufficient thickness, usually greater than about 1 µm, on a transparent substrate may be used as a uniaxial negative C-plate compensator. On the other hand, the aromatic polyimide-based UV curable acrylate alignment films having a thickness of less than about 0.3 µm can be treated as substantially isotropic films in compensator designs.

A TAC substrate film can introduce some negative C-plate character to a compensator structure. However, TAC is commonly available in only certain thicknesses that might not provide sufficient retardation for a specific compensator design and thick optical quality TAC substrates are expensive. Additional negative C-plate retardation can be achieved through the use of a thin aromatic polyimide-based UV curable acrylate film incorporating features of the invention. Examples of compensator structures that benefit from the use of this new alignment film are combinations of aromatic polyimide-based UV curable acrylate with positive birefringent splay O-plates for TN displays, and thicker aromatic polyimide-based UV curable acrylate alignment films combined with positive birefringent A-plates for vertically aligned (VA) displays.

BRIEF DESCRIPTION OF THE DRAWINGS

Further objects, features and advantages of the invention will become apparent from the detailed description, below, when read in conjunction with the accompanying drawings in which.

DETAILED DESCRIPTION

The alignment layer forming part of the present invention may have applications as both an alignment layer and an optical compensator for liquid crystal displays. It preferably comprises a segmented, rigid-rod aromatic polyimide mixed with a UV curable acrylate photopolymer. This alignment layer, when rubbed on a first surface of the film, is capable of aligning nematic liquid crystal molecules in a film on the alignment layer with pretilt. The alignment layer can be used to fabricate films of aligned polymerized liquid crystals, such as A-plates, O-plates, splay O-plates, twist/splay O-plates, A-plates, and cholesteric films for use in liquid crystal displays and other electrooptic devices. The aromatic polyimide-based UV curable acrylate film has applications as both an alignment layer and, when thicker than about 0.5 µm, functioning as a negative uniaxial birefringent C-plate component of an optical compensator for liquid crystal displays.

Thinner films may also be used as the internal alignment layers for TN, STN, and other LCD's employing nematic or chiral liquid crystals. The aromatic polyimide-based UV curable acrylate alignment layer is also useful for the fabrication of multiple layer liquid crystal compensators because it can be coated via solvent casting onto a previously formed polymerized liquid crystal compensator layer without dissolving the previously coated layer. This enables the fabrication of a multilayer liquid crystal film structure through successive coating of alignment and liquid crystal film layers, thus avoiding the need to laminate multiple films. This is not feasible with commonly used polyimide alignment materials because the solvents commonly used for polyimides would dissolve a previously coated polymerized liquid crystal film layer.

The following description demonstrates the broad applicability of various aspects of the invention.

Figure 6:
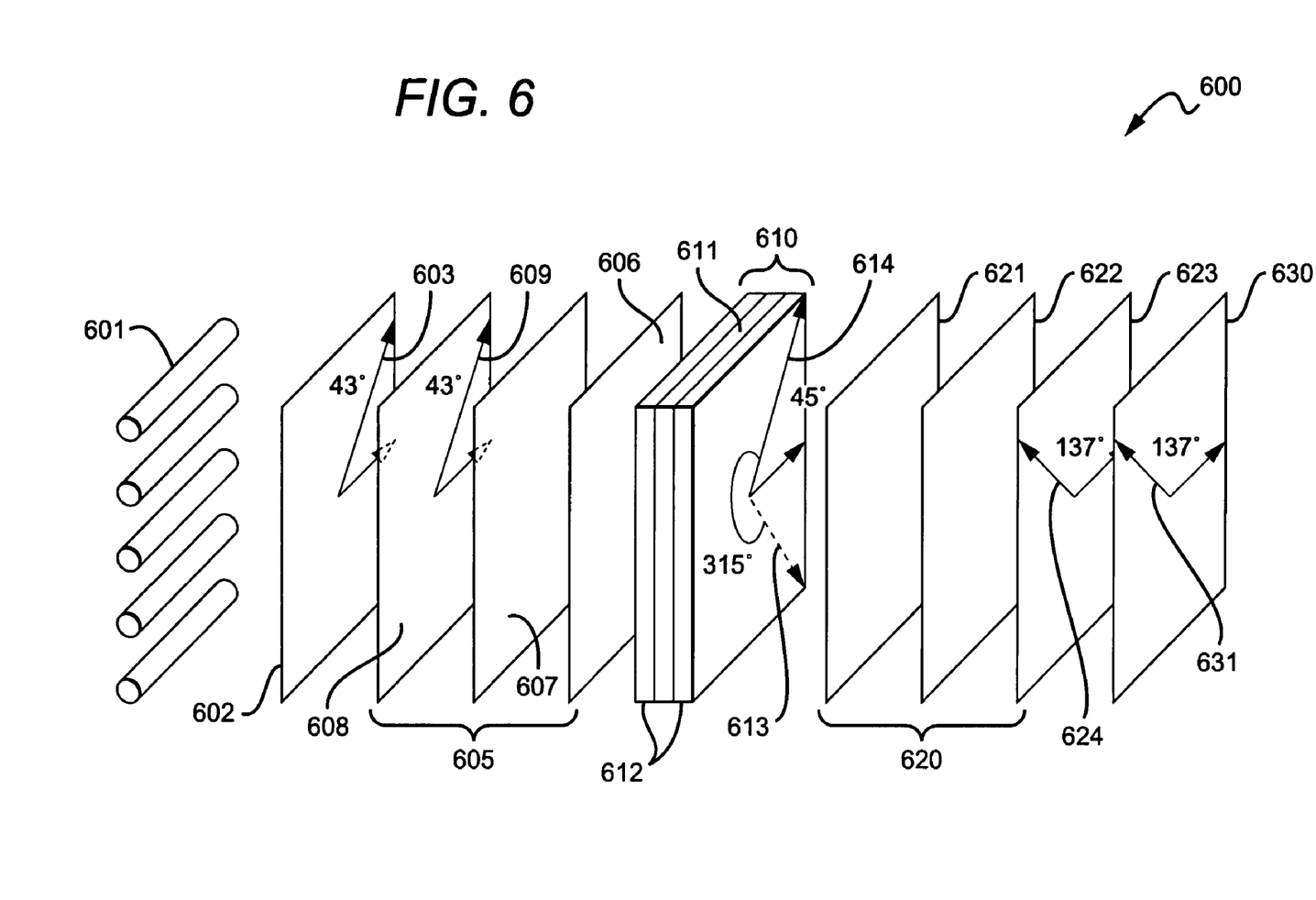
FIG. 6 is a simplified, exploded, perspective view of a liquid crystal display pursuant to still a further embodiment of the invention including a compensator fabricated according to a method such as that outlined in FIG. 2.

Certain organo-soluble segmented, rigid-rod aromatic polyimides when used to cast films undergo a self-orientation process whereby the polyimide backbone becomes aligned parallel to the film surface and having random orientation in the plane. This in-plane orientation results in a film that exhibits uniaxial negative birefringence (uniaxial negative C-plate symmetry) (See, for example, U.S. Pat. No. 5,480,964 incorporated herein by reference in its entirety). Films made from this material cannot be coated with liquid crystal polymers because the solvents will destroy the aromatic polyimide film. Adding a UV curable acrylate photopolymer to the segmented, rigid-rod aromatic polyimide creates a material that is resistant to organic solvents used to fabricate O-plates and A-plates. This modified aromatic polyimide material produces a transparent anisotropic film that exhibits good thermal stability. Films of aromatic polyimide-based UV curable acrylate retain a uniaxial negative birefringence having negative C-plate symmetry. It has been found that the aromatic polyimide-based UV curable acrylate, when used as a substitute for a conventional liquid crystal display polyimide alignment layer, is capable of producing a low cost, easily formed liquid crystal film-based compensator assembly. A feature of the alignment material disclosed herein is its ability to align nematic liquid crystal molecules with pretilt, enabling its use as an alignment film or substrate for a polymerized liquid crystal film. Several LCD modes, including TN and VA, require a negative C-plate compensator to improve the contrast and color stability over wide viewing angles. This is illustrated in FIG. 6 (described in greater detail below) where film 607 and 622 are both an alignment layer for the adjacent compensator film 606 and 621 and a C-plate compensator combined. This combined compensator improves the contrast and color stability of twisted nematic (TN) liquid crystal displays.

An aromatic polyimide-based UV curable acrylate alignment layer, with a thickness sufficient to produce a negative retardation of between 200 nm and 400 nm, when combined with an A-plate creates a film having optical properties similar to those of a commercial stretched polymer film biaxial compensator. Biaxial compensators having this symmetry are known to improve the performance of vertically aligned liquid crystal displays. The negatively birefringent C-plate symmetry (optical axis perpendicular to the film surface) of an aromatic polyimide-based UV curable acrylate alignment layer improves contrast in both the horizontal and vertical directions of a vertically aligned liquid crystal display. The A-plate component is critical to extending the high contrast viewing angles in the diagonal viewing directions.

More recently, liquid crystal "microdisplays", including liquid crystal on silicon (LCOS) displays have been developed for rear projection televisions. Combining a small retardation A-plate with the C-plate characteristics of the new alignment layer creates a compensator that improves the performance of the liquid crystal projection system by increasing the overall optical contrast. The thickness of the aromatic polyimide-based UV curable acrylate film can be adjusted to provide optimum performance for a particular display.

An additional benefit of an aromatic polyimide-based UV curable acrylate film incorporating features of the invention is that the aromatic polyimide-based UV curable acrylate material uses solvents that are compatible with the commonly used TAC substrate. Further, the aromatic polyimide-based UV curable acrylate can be cured at temperatures (80-100° C.) that are compatible with coating on TAC. The aromatic polyimide-based UV curable acrylate can be readily applied, and the compensator fabricated using standard coating techniques such as conventional web coating methods. One skilled in the art will recognize that various UV curing resins may be used. However, a preferred UV curable resin is Norland 68, a UV curable acrylate photopolymer. The aromatic polyimide-based UV curable acrylate alignment layer is inexpensive, and can be used instead of conventional liquid crystal alignment polyimide for fabricating various components of an LCD, including nematic liquid crystal based compensators or as the liquid crystal alignment layers within the liquid crystal cell. The aromatic polyimide-based UV curable acrylate alignment layer is useful for fabricating compensators comprising multiple polymerized liquid crystal A-plate and O-plate compensators since it can be cast onto an already aligned compensator layer without dissolving the previously deposited compensator layers. Thus, the aromatic polyimide-based UV curable acrylate alignment film of this invention also acts as a capping layer and allows for multiple adjacent A-plate and O-plate layers to be fabricated monolithically, without lamination. Additionally, when the aromatic polyimide-based UV curable acrylate alignment layer is deposited within a multiple layer polymerized liquid crystal compensator structure, it can also act as a negative birefringent C-plate compensator layer. Eliminating or reducing the need for a separate polyimide alignment film and eliminating the need for film transfer lamination significantly reduces material and labor costs, reduces defects introduced by film transfer lamination and, as a result, increases production yields and production rate. These and other features and advantages of the invention will be apparent to those skilled in the art.

An illustrative embodiment of the invention is described below using solvent casting techniques to deposit an obliquely oriented (e.g., O-plate) compensator element onto an alignment layer described in the invention which has been deposited onto a transparent substrate (e.g. glass or plastic).

Figure 2:
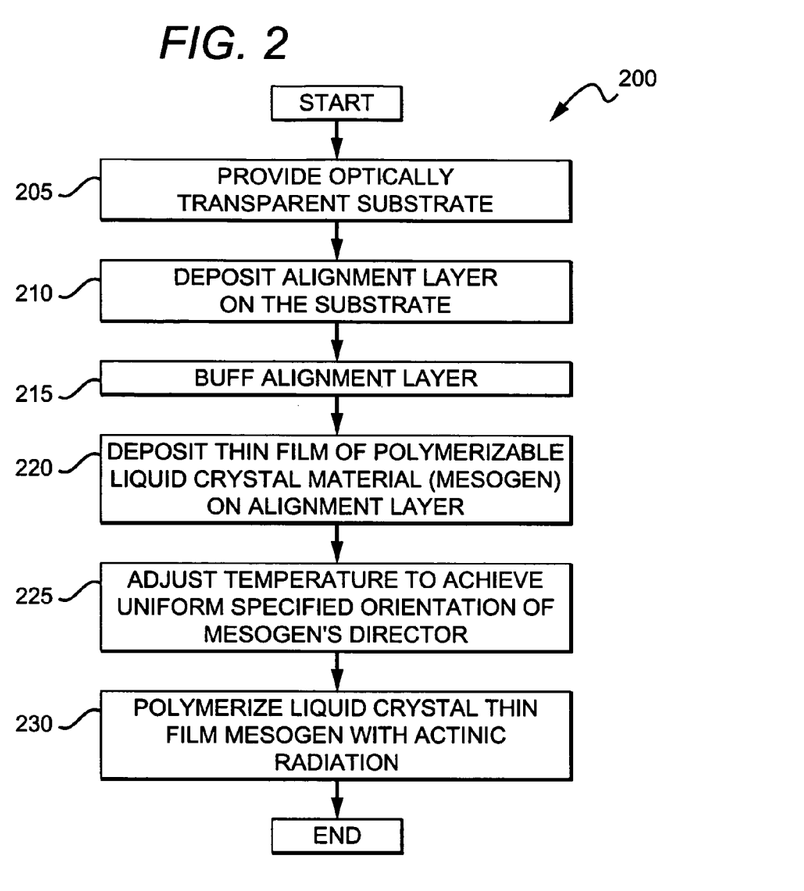
FIG. 2 is a flow chart illustrating a preferred method for preparing a splayed O-plate compensator on an aromatic polyimide-based UV curable acrylate alignment layer.

FIG. 2 is a flow diagram showing a process 200 for fabricating a splayed O-plate compensator using the aromatic polyimide-based UV curable acrylate alignment layer in accordance with one, preferred embodiment of the present invention.

In FIG. 2, an optically transparent substrate is provided in step 205. The substrate can be either glass or plastic and may be one of the plates that form the display's liquid crystal cell. Typical glass substrates are comprised of silicate or soda lime glass, with approximate thickness of 0.5 to 1.1 millimeters (mm). Typical plastic substrates can vary in thickness from approximately 40 to 200 micrometers ($\mu$m). Alternatively, plastic substrates may be comprised of any suitable polymer material such as Triacetyl cellulose (TAC).

In step 210, a negative C-plate polyimide alignment layer having a composition according to an aspect of the present invention is solvent cast onto a surface of the substrate 205 using standard film deposition techniques.

In a preferred embodiment, the aromatic polyimide-based UV curable acrylate alignment layer is solvent cast onto the substrate using standard techniques for film forming. The aromatic polyimide and the UV curable acrylate photopolymer material are first dissolved in a solvent (e.g., ethyl lactate) to form a solution. Suitable solvents include MEK, acetone and ethyl lactate. The preferred solvent is ethyl lactate. A thin film of this solution is then applied to the surface of the substrate. After the solvent is evaporated, for example, by drying at a temperature of 80° C. for 10 minutes, a thin film of modified aromatic polyimide material remains on the substrate. The film is then UV cured, producing a layer of from about 0.3 to about 10 μm in thickness. In web coating processes, the drying process can be significantly accelerated.

Other coating techniques which are compatible with the inventive method include spin-coating, Meier-rod or doctor-bar coating, meniscus coating, and various continuous web coating methods shown in art.

In step 215, an outer surface of the C-plate alignment layer is rubbed with, for example, a rayon cloth to generate a suitable alignment surface that also produces liquid crystal pre-tilt in a polymerized, aligned liquid crystal film subsequently deposited on the alignment surface. This pretilt feature causes nematic liquid crystals at the surface of the alignment film to have a tilt in the orientation of their principal axis of several degrees (e.g., 2-10 degrees) from the surface of the alignment film. This insures that the liquid crystal film forms in a single crystalline domain over the area of the compensator.

In one embodiment, a buffing cloth comprised of a rayon pile approximately 1.8 mm in height, attached to the outer surface of a 4 inch diameter aluminum cylinder rotating at a speed of approximately 200 to 1,000 revolutions-per-minute is applied to the film. As it rotates, the cylinder moves horizontally across the surface of the alignment layer at a speed of approximately 0.5 to 5.0 centimeters-per-second. The height of the aluminum cylinder above the alignment layer surface is preferably adjusted so that the pile touches the surface of the alignment layer and is deflected by the alignment layer a distance of approximately 0.2 to 0.6 mm.

In step 220, a thin film of polymerizable nematic liquid crystal material is deposited on the buffed alignment layer 220. For certain subsequent operations, the liquid crystal material can contain a photoinitiator such as, for example, approximately 0.5% of Irgacure 651 (available from Ciba-Geigy). Polymerizable liquid crystal materials having a nematic phase suitable for use in the inventive method include, but are not limited to, acrylates, epoxides, and vinyl ethers. The chemical structure of the polymerizable liquid crystal material is selected so that it has an intrinsic angle θ at its air interface of between 25° and 85° when it is in its nematic phase. That surface of the thin film liquid crystal immediately adjacent to the underlying alignment layer is referred to as the alignment-layer interface; the surface of the liquid crystal thin film exposed to the air is referred to as the air interface. In one embodiment, the polymerizable liquid crystal material RM257 (available from E.M. Industries) is solvent cast onto the alignment layer using cyclohexanone as a solvent so that a thin film layer of RM257 of approximately 1 μm is formed.

In step 225, the temperature of the thin film liquid crystal material is adjusted to achieve a uniform specified orientation of the liquid crystal molecules, e.g., the angle orientation of the liquid crystal molecules, at the alignment surface and throughout the thickness of the film. In one embodiment, the liquid crystal film prepared in step 210 is heated to approximately 90° C. for approximately 30 seconds to 5 minutes depending upon the specific solvent used. Those of ordinary skill in the field will recognize that the specific temperature and time required for this operation are dependent on, among other factors, the liquid crystal material used, its thickness, and the desired pretilt angle, as well as the specific coating process. For example, the time required to achieve the intended liquid crystal alignment can be significantly shorter in web coating processes using forced air drying and heating. In practice, the temperature range for this step can range from room temperature (about 28° C.) to approximately 100° C.

In step 230, the liquid crystal thin film is polymerized in an oxygen-free environment by illuminating it with ultraviolet radiation. Oxygen will inhibit the polymerization process and may be excluded by purging the area containing the film with dry nitrogen gas. For example, the liquid crystal film of step 225 is illuminated with ultraviolet light at a wavelength of about 360 nanometers (nm) at approximately 10 milliwatts-per-cm$^2$ intensity for approximately 5 minutes. However, the time can be adjusted to produce the designed level of polymerization. As known to those of ordinary skill in the art, the concentration of photoinitiator, the intensity of ultraviolet light, and the duration of exposure are interdependent and subject to modification—the goal being to achieve a high degree of conversion (greater than 80%) of the reactive liquid crystal material.

FIG. 3 is a schematic cross section of an illustrative embodiment of a compensator structure 300 in accordance with the present invention. The structure 300 comprises a substrate 301 fabricated of either a glass or a suitable transparent plastic or polymer film, for example, triacetyl cellulose (TAC). A thin (<0.5 mm), aromatic polyimide-based UV curable acrylate alignment layer 302 having a composition according to an aspect of the present invention is deposited on a surface 301a of the substrate 301. The thinner alignment layer 302 does not have C-plate symmetry. The aromatic polyimide-based UV curable acrylate alignment layer 302 has an outer surface 303 that is rubbed with, for example, a rayon cloth, to generate a suitable alignment surface that also produces liquid crystal pre-tilt in a polymerized, aligned liquid crystal film 305 subsequently deposited on the alignment surface. The polymerized liquid crystal film 305 can have an A-plate, O-plate, or splayed O-plate optical symmetry.

FIG. 4 is a schematic cross section of an illustrative embodiment of the invention comprising a compensator structure 400 that can be used to improve contrast and color stability over viewing angles for a normally white twisted nematic liquid crystal display. In this case a film 402 comprising aromatic polyimide-based UV curable acrylate and having a thickness greater than about 1 μm is formed on a suitable substrate 401. At these thicknesses the aromatic polyimide-based UV curable acrylate film 402 acts as a negative birefringent C-plate film within the compensator structure. As in FIG. 3, the surface of the aromatic polyimide-based UV curable acrylate layer is rubbed producing a suitable alignment surface 403 for a polymerized liquid crystal layer 405. In the specific case of a compensator for a normal white TN display, the polymerized liquid crystal compensator layer 405 may be a splay O-plate having a thickness in the range of 0.5 to 1.4 microns.

Figure 5:
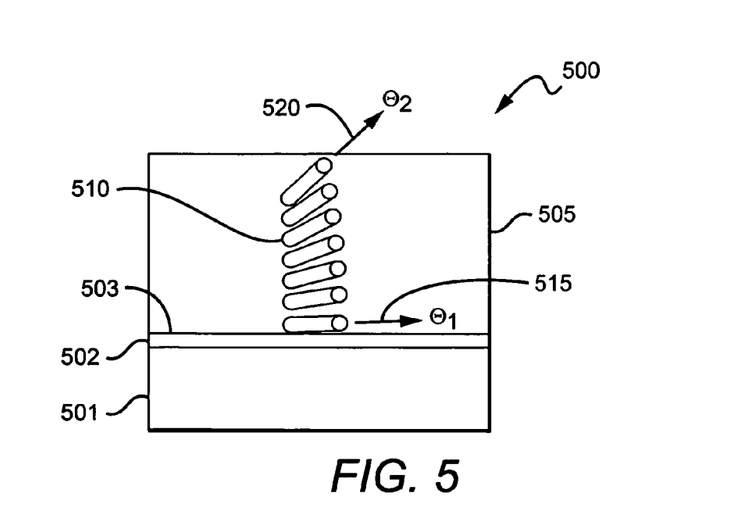
FIG. 5 is a simplified cross sectional view of a compensator structure in accordance with yet another embodiment of the invention illustrating the orientation of the liquid crystal molecules in a polymerized liquid crystal film in a splayed O-plate compensator configuration.

FIG. 5 shows a schematic representation of a splay O-plate compensator film structure 500 illustrating another embodiment of the invention. As in FIGS. 3 and 4, an aromatic polyimide-based UV curable acrylate alignment film 502 is formed on a suitable substrate 501 and rubbed to induce a liquid crystal alignment surface 503 with pretilt. A layer 505 of polymerizable nematic liquid crystal is coated onto the alignment surface 503. The nematic molecules 510 orient with the rub direction of the alignment surface and assume a small pretilt angle $\Theta_1$ (515) with respect to the plane of the surface. The nematic/air angle $\Theta_1$ (520) of the nematic molecules at the air, or free surface, is determined by the characteristics of the liquid crystal mixture and the process temperature. The pretilt at the alignment surface is critical to establishing preferred alignment bias in the liquid crystal film, insuring that all of the liquid crystal molecules, as in this case, have a splay orientation proceeding in a counterclockwise direction from the alignment surface to the air surface.

FIG. 6 is a schematic illustration of an exemplary liquid crystal display structure 600 incorporating features of the invention. The structure 600 includes a twisted nematic LCD and a compensator as described herein. Beginning on the side of the display adjacent a rear illumination source 601, the first component is a rear polarizer 602 having an oriented absorption axis 603 followed by a first compensator assembly 605. The first compensator assembly 605 comprises a TAC substrate 606, an aromatic polyimide-based UV curable acrylate alignment layer 607 which also acts as a negative birefringent C-plate, and a splayed O-plate layer 608 with the projection of its optical axis into a plane 609 oriented parallel to the polarizer absorption axis 603 (the optic axis of the liquid crystal polymer is splayed out of the plane of the film from a small pretilt angle, ~2°, to an angle less than about 90° from the plane of the film). The compensator assembly 605 is located on a first side of a liquid crystal cell 610. The liquid crystal cell 610 comprises a twisted nematic liquid crystal material 611 encapsulated between two glass plates 612. The glass plates contain typical liquid crystal display features including color filters, thin film transistor multiplex drive electronics, transparent electrodes and liquid crystal alignment films having rub angles 613 and 614 on the source side and viewer side, respectively. A second compensator assembly 620 is positioned on the front side (viewer side) of the liquid crystal cell 610 having a similar structure to that of the first compensator 605 assembly. This second compensator assembly comprises a TAC substrate 621, an aromatic polyimide-based UV curable acrylate alignment layer 622, and a splay O-plate film 623 having an optical axis projection 624 oriented parallel to the absorption axis 631 of the viewer side polarizer 630. The front polarizer 630 is also referred to as the analyzer.

The exact thicknesses and orientations of the layers can vary. However, the parameters chosen for the purpose of this illustration are as follows:

TABLE 1

Preferred Parameters for a Compensated Twisted Nematic (TN) LCD

| | |
|---|---|
| Rear (source side) Polarizer | Absorption axis = 43° |
| Splay O-plate | Thickness = 0.9 μm |
| | Optical axis in plane projection = 43° |
| Aromatic Polyimide-based UV Curable Acrylate Alignment Film | Thickness = 1 μm Rub Direction 43° |
| TAC Film Substrate | Thickness = 80 μm |
| Source side Glass | Thickness ~0.5 mm |
| | Alignment rub angle = 315° |
| Liquid Crystal | Thickness ~5 μm |
| Viewer side Glass | Thickness ~0.5 mm |
| | Alignment rub angle = 45° |
| TAC Film Substrate | Thickness = 80 μm |
| Aromatic Polyimide-based UV Curable Acrylate Alignment film | Thickness = 1 μm Rub Direction = 137° |
| Splay o-plate | Thickness = 0.9 μm |
| | Optical axis in plane projection = 137° |
| Front (viewer side) polarizer | Absorption axis = 137° |

While Table 1 lists the characteristics of a preferred arrangement, other combinations may be used. For example, the absorption axis of the rear polarizer may vary from about 41° to about 48°, the absorption axis of the front polarizer may vary from about 135° to about 139°, the thicknesses of the O-plates may vary from about 0.6 μm to about 1.5 μm, and the thicknesses of the alignment layer may vary from about 1 μm to about 10 μm. TAC films, which may be used in thicknesses from about 30 μm to about 120 μm thick, exhibit nearly zero in-plane retardance and a negative out-of-plane retardance from about −30 nm to about −120 nm contributing to the total retardation characteristics of the compensator. While TAC is a preferred substrate, other typical materials, such as glass plates can also be used. If an isotropic substrate is used, the necessary negative C-plate retardation component may be obtained by using a suitably thick layer of aromatic polyimide-based UV curable acrylate.

Figure 7:
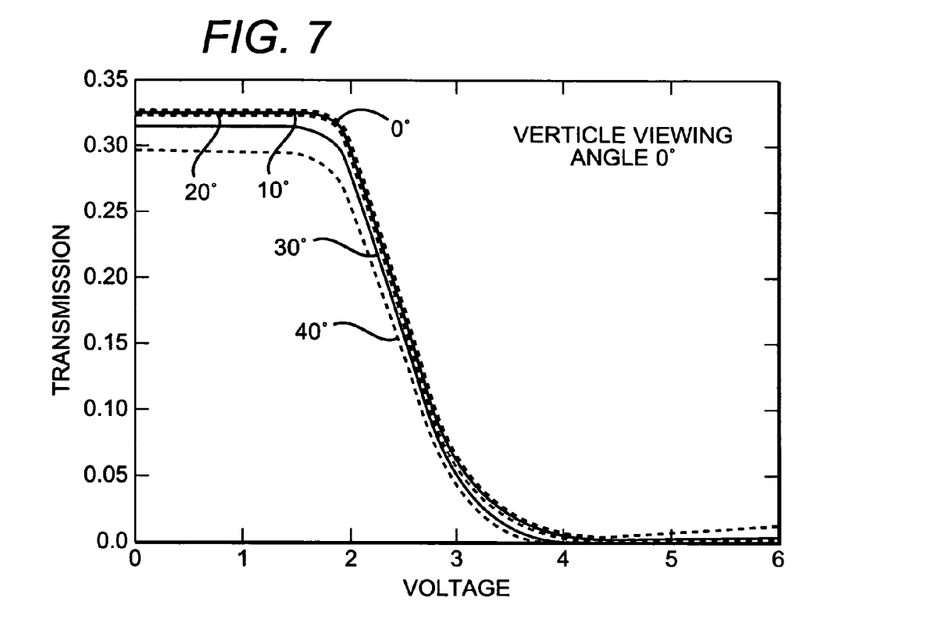
FIG. 7 shows the transmission versus voltage electro-optic curves for a normally white twisted nematic display without the benefit of a compensator film at 0° vertical viewing angle for various horizontal viewing angles.

FIG. 7 shows the transmission vs. voltage curves for a normally white twisted nematic display without the benefit of the aromatic polyimide-based UV curable acrylate alignment film and compensator of the invention for a range of horizontal viewing angles at a fixed vertical viewing angle of 0°. The curves nearly overlie each other, enabling relatively constant contrast and good gray level stability over viewing angles.

Figure 8:
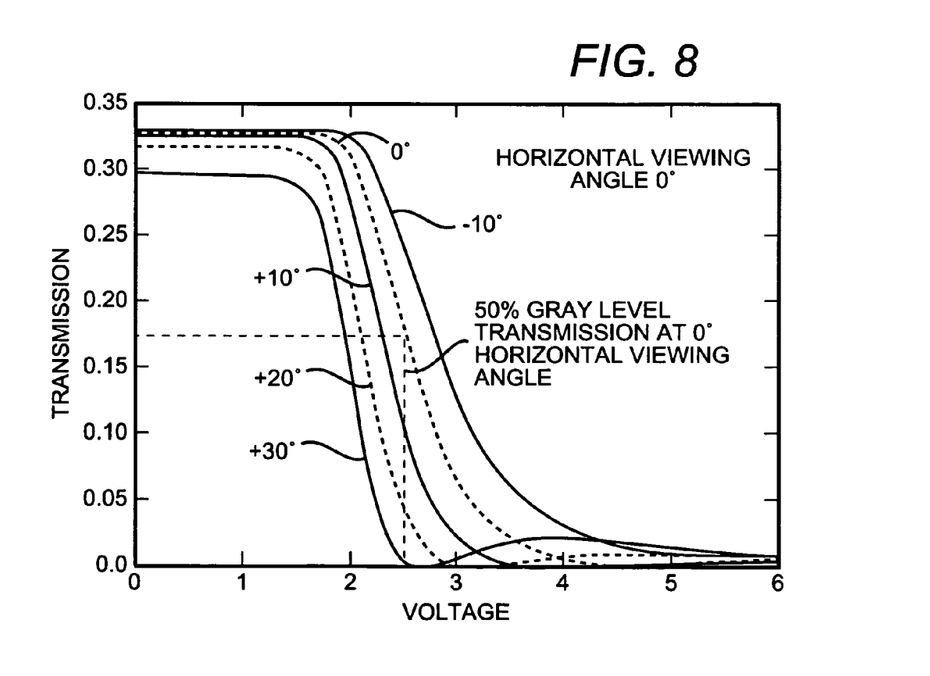
FIG. 8 shows the transmission versus voltage electro-optic curves for a normally white twisted nematic display without the benefit of a compensator film at 0° horizontal viewing angle for various vertical viewing angles.

FIG. 8 shows the transmission vs. voltage curves for a normally white twisted nematic display without the benefit of the aromatic polyimide-based UV curable acrylate alignment film and compensator of the invention for a range of vertical viewing angles at a fixed horizontal viewing angle of 0°. The large variation of transmission vs. vertical viewing angle at a selected voltage results in significant changes in the appearance of colors that are rendered at intermediate brightness levels, or gray levels, as the vertical viewing direction varies. The rebound in the transmission vs. voltage curve at higher voltages makes selection of an optimum voltage for the black state difficult, resulting in a very limited high contrast vertical field of view.

Figure 9:
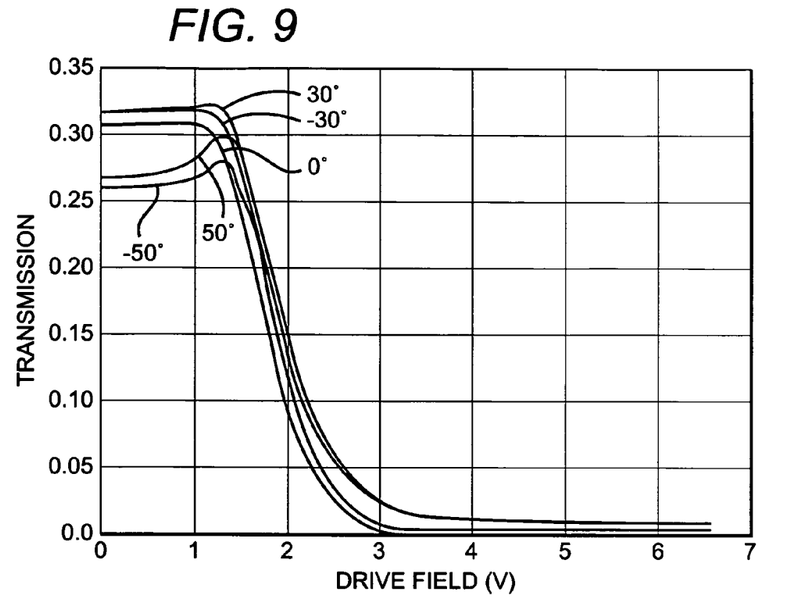
FIG. 9 shows calculated transmission versus voltage electro-optic curves for a compensated normally white twisted nematic liquid crystal display at 0° vertical viewing angle for various horizontal viewing angles having the configuration of FIG. 6.

FIG. 9 shows the calculated transmission vs. voltage curves for zero vertical viewing angle and various horizontal viewing angles for the display of the configuration shown in FIG. 6 and described in a Table 1 which has the benefit of the compensator as described herein. There is little variation to the shape of the curves with viewing angle and a well defined black state can be achieved at voltages greater than 4 V.

Figure 10:
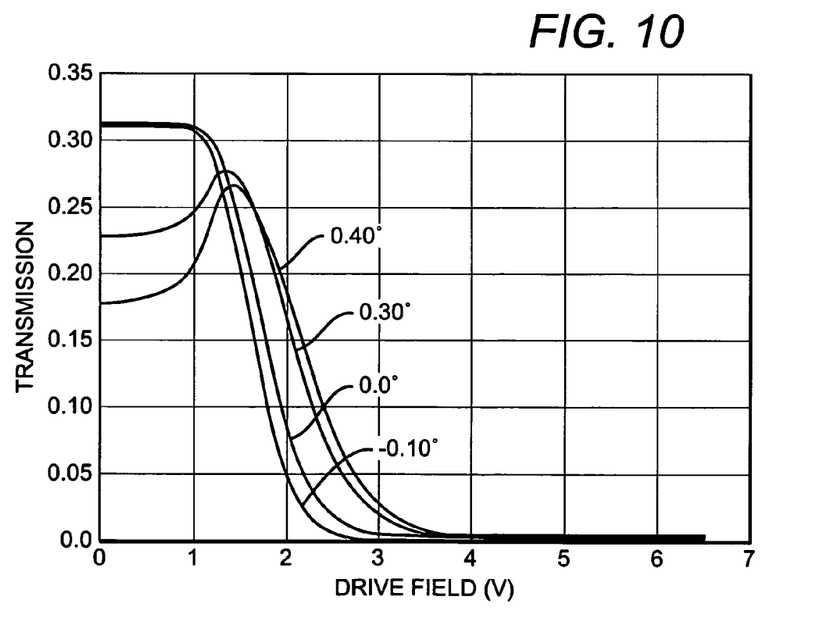
FIG. 10 shows calculated transmission versus voltage electro-optic curves for a compensated normally white twisted nematic liquid crystal display at 0° horizontal viewing angle for various vertical viewing angles having a configuration such as that shown in FIG. 6.

FIG. 10 shows the calculated transmission vs. voltage curves for zero horizontal viewing angle and various vertical viewing angles for the display of configuration shown in FIG. 6 and described in a Table 1 which has the benefit of the compensator of this invention. The transmission variation at gray level voltages is reduced and a well defined black state over large vertical viewing angles is achieved for drive voltage greater than 4 V.

Figure 11:
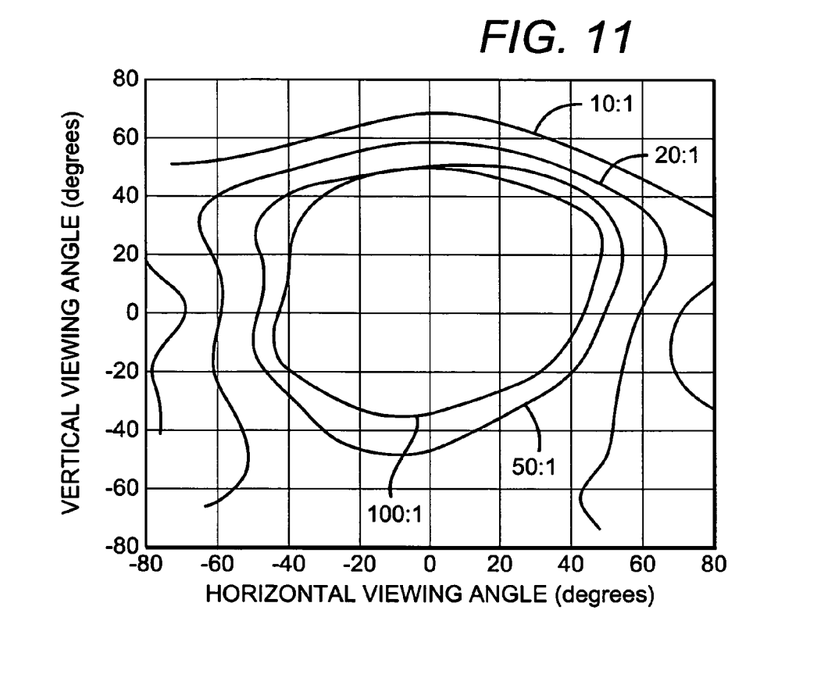
FIG. 11 is a plot, as a function of vertical and horizontal viewing angle, depicting calculated isocontrast contours for the compensated normally white twisted nematic liquid crystal display configuration such as that depicted in FIG. 6.

FIG. 11 is a graph illustrating the contrast contours of a twisted nematic LCD assembly such as shown schematically in FIG. 6 with the parameters listed in Table 1 illustrating that the described structure provides a minimum contrast ratio of 10:1 out to +/−70° in both the horizontal and vertical directions while achieving broad viewing angles with high contrast of greater than 100:1.

Other compensator embodiments using the features of this invention can be used to improve the viewing angle characteristics of other types of liquid crystal displays. For example, a multidomain vertically aligned (VA) liquid crystal display is known to exhibit an improved viewing angle when a compensator having a large negative birefringent C-plate character (retardation preferably 200 nm-400 nm) together with a positively birefringent A-plate film having low retardation (retardation of 50-200 nm, preferably 80-120 nm) is added.

Figure 12:
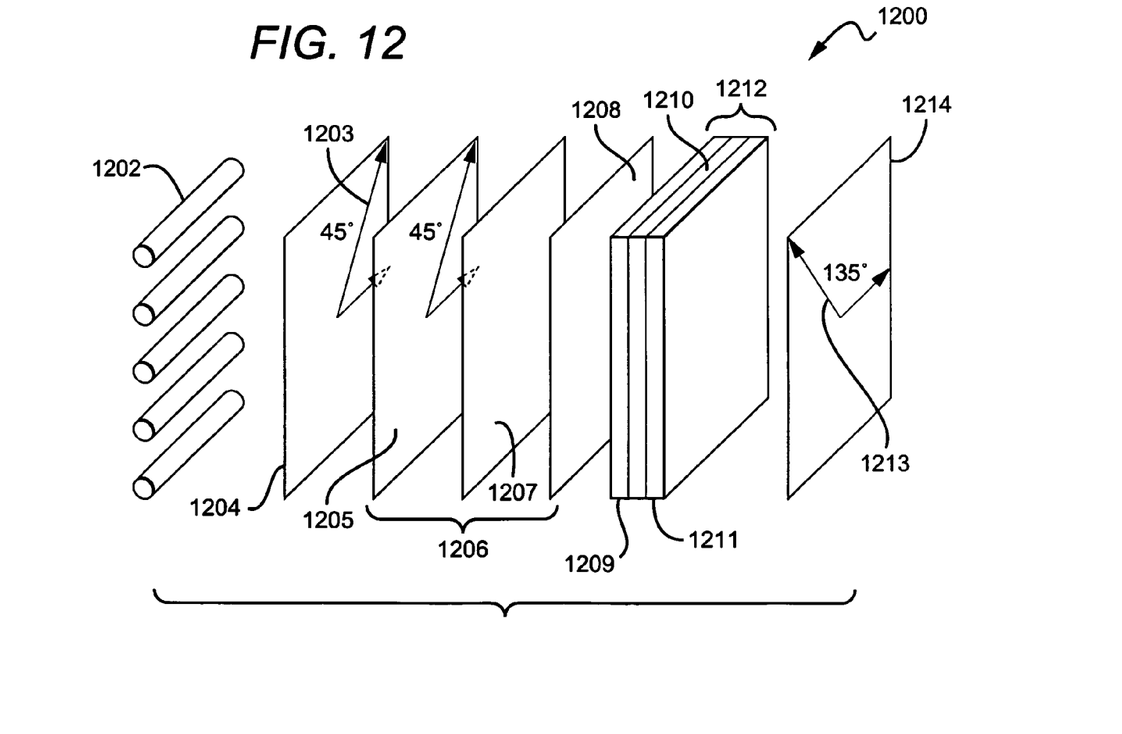
FIG. 12 is a schematic diagram of a vertically aligned liquid crystal display in accordance with an exemplary embodiment of the invention.

FIG. 12 is an exploded, schematic diagram of another exemplary embodiment of the invention comprising a vertically aligned liquid crystal display structure 1200. The liquid crystal display structure 1200 comprises a rear light source 1202, a rear polarizer 1204 having an absorption axis 1203 oriented at 45°, a compensator 1206 according to the teachings of this invention, a vertically aligned liquid crystal cell 1212, and a front or viewer side polarizer or analyzer 1214 having an absorption axis oriented at 135° (1213).

The liquid crystal cell 1212, in accordance with this example, comprises a vertically aligned liquid crystal layer 1210, about 5 microns thick, sandwiched between front and rear glass substrates 1209 and 1211, respectively, each having a thickness of about 0.5 mm. In well known fashion, the glass substrates 1209 and 1211 may contain or carry conventional liquid crystal display features including color filters, thin film transistor multiplex drive electronics, transparent electrodes, and liquid crystal alignment films on the front and rear surfaces.

Disposed between the rear polarizer (side adjacent to illumination source) 1204 and the liquid crystal cell 1212 is a compensator assembly 1206 in accordance with one aspect of the invention. The compensator assembly 1206 comprises (1) a transparent TAC substrate 1208 (2) a rubbed, negative birefringent aromatic polyimide-based acrylate alignment layer 1207 coated on the TAC substrate 1208, and having a rub direction of 45°, and (2) an A-plate layer 1205 coated onto the aromatic polyimide-based acrylate alignment layer 1207 on the side facing the rear polarizer. The alignment layer acts also as a negative birefringent C-plate. The A-plate layer 1205 comprises a polymerized liquid crystal film whose molecular axis lies in the plane and is oriented at 45°, that is, parallel with the rub direction of the aromatic polyimide-based acrylate alignment layer. The front polarizer 1214 is also referred to as the analyzer.

The exact thicknesses and orientations of the layers can vary. However, by way of example and not limitation, the parameters may be as follows:

TABLE 2

Preferred Parameters for a Biaxial Compensated Vertically Aligned LCD

| | |
|---|---|
| Rear (source side) Polarizer | Absorption axis = 45° |
| A-plate | Thickness = 0.8 |
| | Orientation = 45° |
| Aromatic Polyimide-Based Acrylate Alignment Layer | Thickness = 6 μm |
| | Rub Direction = 45° |
| TAC Film Substrate | Thickness = 80 μm |
| Source Side Glass | Thickness ~0.5 mm |
| Liquid Crystal | Vertically Aligned |
| Viewer Side Glass | Thickness ~0.5 mm |
| Front (Viewer Side) Polarizer | Absorption Axis = 135 |

While the foregoing table lists the characteristics of a preferred arrangement, other characteristics may be employed. For example, the thickness of the A-plate 1205 may vary from about 0.2 microns to about 1.5 microns, and the thickness of the aromatic polyimide-based acrylate alignment layer 1207 may vary from about 1 micron to about 10 microns.

Figure 13:
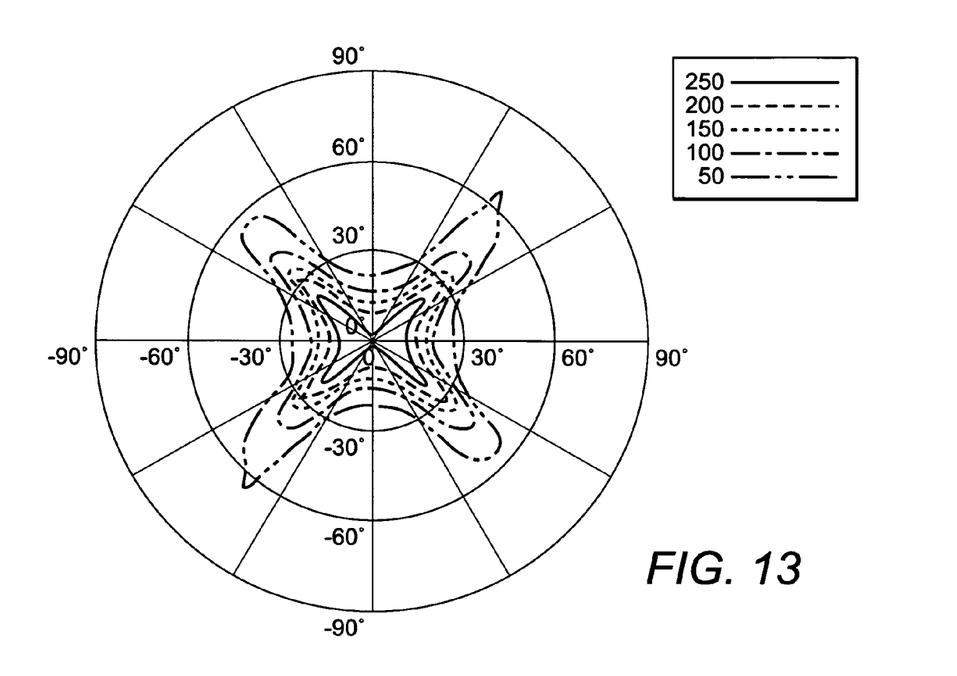
FIG. 13 is an isocontrast plot of an uncompensated vertically aligned display.

FIG. 13 shows isocontrast plots of an uncompensated vertically aligned display. The display provides a minimum contrast ratio of 50:1 out to only about plus or minus 60° in both the horizontal and vertical directions and that only very narrow viewing angles are achieved with higher contrast ratio of 250:1.

Figure 14:
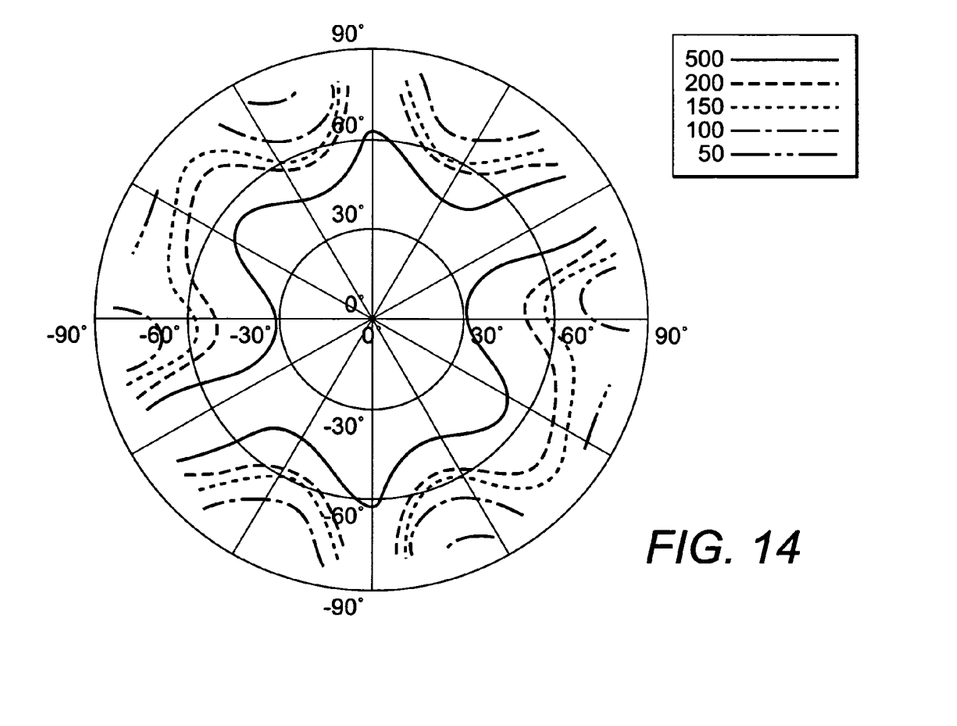
FIG. 14 is an isocontrast plot of a vertically aligned display compensated in accordance with the present invention.

FIG. 14 shows isocontrast plots of a vertically aligned display that has the benefit of the aromatic polyimide-based acrylate C-plate/A-plate compensator of the present invention for a vertically aligned LCD assembly such as that shown schematically in FIG. 12 with the parameters listed in the Table 2, above. This plot shows that a vertically aligned display compensated in accordance with the present invention provides a minimum contrast ratio of 50:1 out to about plus or minus 80° in both the horizontal and vertical directions while achieving broad viewing angles with higher contrast ratios of up to 500:1.

Such a configuration will extend the region of high contrast to large viewing angles with contrast ratios greater than 500:1 out to a viewing angle of about ±40° greater than 100:1 at viewing angles up to about ±60° as shown in FIG. 14. In this embodiment, the aromatic polyimide-based acrylate film serves as the negative C-plate as well as the alignment film for the A-plate. In the event that the compensator is deposited onto a TAC substrate, the TAC films can comprise some fraction of the C-plate retardation, the remainder being provided by the aromatic polyimide-based acrylate film.

FIG. 15 shows a cross section of a multilayer polymerized liquid crystal compensator structure 1500 in accordance with another embodiment of the present invention. A first aromatic polyimide-based UV curable acrylate alignment film 1503 is applied to a substrate 1501. The first aromatic polyimide-based UV curable acrylate film 1503 may have a thickness from 1 μm to 10 μm, contributing to the negative C-plate feature of the compensator. A polymerized liquid crystal compensator film 1504 is formed on the first aromatic polyimide-based UV curable acrylate alignment film 1503 with an alignment surface 1505 on the aromatic polyimide-based UV curable acrylate layer 1503 in contact with the LC compensator film 1504. This assembly provides a structure similar to that shown in FIGS. 3, 4 and 5. A second layer of aromatic polyimide-based UV curable acrylate alignment film 1510 as described herein is then formed on the surface of the first LC compensator film 1504. The film 1510 is rubbed to create a second alignment surface 1511 and a second polymerizable liquid crystal compensator film layer 1512 is formed on the second alignment surface 1511. The second aromatic polyimide-based UV curable acrylate alignment film 1510 may also have a thickness from about 1 μm to about 10 μm, contributing a negative C-plate characteristic to the compensator assembly. The polymerizable liquid crystal compensator films may be A-plates, O-plates, splay O-plates, or chiral films. The process may be repeated multiple times to create the desired compensator structure.

The aromatic polyimide-based UV curable acrylate film of the invention may also be used as an alignment film and as a uniaxial negative birefringent C-plate retardation component for polymerized liquid crystal films that are used as brightness enhancement films for liquid crystal displays. Polymerized liquid crystal brightness enhancement films use layers of cholesteric liquid crystal materials to transmit a first circular polarization and reflect the other circular polarization. The reflected light is then reflected with polarization change from the rear structure of the display backlight so that it can then be transmitted through the brightness enhancement film, thus overcoming some of the polarization loss inherent in all LCDs. A quarterwave plate on the exit surface of the brightness enhancement film changes the transmitted circular polarization to linear polarization, which is then transmitted through the liquid crystal display polarizer. A brightness enhancement film of this design exhibits a noticeable color change with increasing viewing angle. This color change can be minimized using the compensator design described in U.S.

Pat. No. 5,731,886, incorporated herein by reference, which comprises a negative C-plate compensator combined with an A-plate film. U.S. Pat. No. 5,731,886 describes a device that includes a layer of cholesteric material of the type which transmits light having a first circular helicity and reflects light having a second circular helicity. A quarter-wave plate positioned on a first side of the layer of cholesteric material converts the transmitted light having the first circular helicity into linearly polarized light. A compensator including a negatively birefringent C-plate layer is disposed between the layer of cholesteric material and the quarter-wave plate. The compensator reduces undesirable phase effects in the transmitted light introduced by the layer of cholesteric material. The aromatic polyimide-based UV curable acrylate materials and structures described herein may be used as the alignment film for the cholesteric brightness enhancement film, and also as the alignment film, and C-plate component for the brightness enhancement film compensator.

It will be evident from the preceding descriptions and embodiments that the aromatic polyimide-based UV curable acrylate materials and structures described herein may be used for a wide range of liquid crystal display arrangements as summarized in Table 3. Compensator embodiments such as those listed in Table 3 incorporating aromatic polyimide-based UV curable acrylate films can also be used in other liquid crystal devices (including beam steering and phase compensation devices) as well as other structures incorporating compensator films shown in the prior art.

TABLE 3

Compensator Embodiments in Liquid Crystal Displays

| Compensator Configuration | Liquid Crystal Cell Type |
|---|---|
| Aromatic polyimide-based UV curable acrylate alignment film + A-plate | Vertically Aligned (VA) display, Super Twist Nematic (STN) display, Liquid Crystal Projectors |
| Aromatic polyimide-based UV curable acrylate alignment film + O-plate | Twisted Nematic (TN) display |
| Aromatic polyimide-based UV curable acrylate alignment film + splayed O-plate | TN |
| Thick aromatic polyimide-based UV curable acrylate (C-plate) | TN, VA |
| Thick aromatic polyimide-based UV curable acrylate + A-plate | VA, Liquid crystal projector |
| Thick aromatic polyimide-based UV curable acrylate + O-plate | TN |
| Thick aromatic polyimide-based UV curable acrylate + splayed O-plate | TN |
| Multiple layer aromatic polyimide-based UV curable acrylate + compensator film | TN, VA, Electrically controlled birefringence (ECB) display, In-Plane Switching (IPS) display |

Preparation of Aromatic Polyimide-Based UV Curable Acrylate Material

A mixture was prepared by dissolving 11.2 g of aromatic polyimide (DuPont Pyralin Polyimide PI 4700), 2.8 g of acrylate photopolymer (NOA 68, Norland), and 86 g of ethyl L-lactate (Spectrum). The aromatic polyimide, uniaxial, negative birefringent C-plate material (Pyralin Polyimide PI4700) is commercially available from DuPont, and is described in *Polyimide films as negative birefringent compensators for normally white twisted nematic liquid crystal displays*, Li, et al., *Polymer*, Vol. 37, No. 23, pp. 5321-5325, 1996.

The relative proportions by weight are preferably in the range of 50-90% of aromatic polyimide and 10-50% of acrylate photopolymer for 100% of the mixture of the two constituents. More preferably, the relative proportions may be 20% acrylate photopolymer and 80% aromatic polyimide.

The mixture was stirred for 2 hours using a magnetic stirrer.

The mixture was then filtered through a filter membrane having a 2 μm pore size. The modified aromatic polyimide alignment layer was produced by casting a film, using known techniques onto a rigid (glass or TAC) substrate. The wet film was air-dried at a temperature of 80° C. for 10 minutes, and UV-cured by means of a UV lamp curing system (Fusion UV Systems Inc.) with a wavelength of about 360 nanometers (nm) at approximately 10 milliwatts-per-cm$^2$ at a speed of 10 fpm in dry nitrogen environment (oxygen free). The UV-cured film was further cured thermally at 90° C. for 30 minutes. One of the major surfaces of the film was rubbed in the desired direction using a cylindrical rubbing machine rotating at a speed of 500 rpm with 1 cm/sec advancing speed to produce a film with a pretilt angle between 2° and 6°. The pile deflection of the rayon roller was 0.35 mm. The rubbed aromatic polyimide film was cleaned with dry nitrogen to remove any rubbing debris.

An A-plate film was prepared by dissolving 8 g of reactive mesogen liquid crystal (RM257, Merck), 0.08 g of photoinitiator (Irgacure 651, Merck), 0.008 g of thermal inhibitor (4-ethoxyphenol, Aldrich), 0.028 g of surfactant (poly(cyclohexyl methacrylate) (M.W. 20,000), Scientific Products), and 92 g of cyclohexanone (Aldrich). The mixture was stirred for 2 hours using a magnetic stirrer. The mixture was filtered through a filter membrane having a 0.45 μm pore size. The mixture was solvent cast by known techniques. The wet film was air-dried at a temperature of 85° C. for 2 minutes, and UV-cured by means of a UV lamp system, at a wavelength of about 360 nanometers (nm) at approximately 10 milliwatts-per-cm$^2$ and a speed of 10-feet/minute in a nitrogen environment.

The preferred thickness of the C-plate may range from about 0.5 μm to about 6 μm, while a preferred thickness of the A-plate may range from about 0.2 μm to about 1.4 μm.

While the use of an aromatic polyimide-based UV curable acrylate film as an alignment device in a compensator assembly has been described in regard to particular assemblies, component arrangements, dimensions and material concentrations, the invention described herein is not intended to be limited to the specific embodiments set forth herein. One skilled in the art will recognize that, based on the teachings set forth herein, the described invention may be applied in different manners and for other uses. For example, applications of the aromatic-polyimide-based UV curable acrylate alignment films described herein include, but are not limited to, numerous devices including electronically controlled screen displays such as television screens and monitors, cell phones, computer displays including lap tops, desk top and portable computer screens, digital cameras, panel displays on equipment, liquid crystal electro-optical devices, beam steering optics, wavefront correction systems and related or similar devices. Also, while use with polymerizable liquid crystal materials applied from solvent solutions is disclosed, it is also contemplated that assemblies which utilize the aromatic polyimide-based UV curable acrylate alignment films can also be used in conjunction with prior polymerized liquid crystal materials which can be melt cast to form oriented films.

We claim:
1. A liquid crystal display assembly comprising:
   a polarizer adjacent to a lighting source, said polarizer having an oriented absorption axis;
   a viewer side analyzer having an absorption axis substantially perpendicular to the oriented absorption axis of the polarizer adjacent to the lighting source;
   a liquid crystal cell comprising a twisted nematic liquid crystal material between the polarizer and the analyzer; and
   at least one compensator assembly located between the polarizer and the analyzer, the at least one compensator comprising:
      an aromatic polyimide-based UV curable acrylate film with a first surface rubbed to create an alignment layer; and
      a polymeric nematic liquid crystal film on the alignment surface of the rubbed aromatic polyimide-based UV curable acrylate film, said rubbed aromatic polyimide-based UV curable acrylate layer causing a pretilt in the polymerized nematic liquid crystal film.
2. The liquid crystal display assembly of claim 1 wherein the aromatic polyimide-based acrylate alignment layer comprises:
   an acrylate photopolymer; and
   an aromatic polyimide material mixed with said acrylate photopolymer.
3. The liquid crystal display assembly of claim 1 wherein:
   at least one compensator assembly is located between the polarizer and the liquid crystal cell; and
   a second compensator assembly is located between the analyzer and the liquid crystal cell.
4. The liquid crystal display assembly of claim 1 wherein:
   the aromatic polyimide-based UV curable acrylate layer has a thickness greater than about 0.5 μm.
5. The liquid crystal display assembly of claim 1 wherein:
   the aromatic polyimide-based UV curable acrylate layer has a thickness from about 0.5 μm to about 10 μm.
6. The liquid crystal display assembly of claim 1 wherein:
   said aromatic polyimide-based UV curable acrylate layer also functions as a negative uniaxial birefringent C-plate.
7. The liquid crystal display assembly of claim 1 wherein:
   the polymeric nematic liquid crystal film has a thickness ranging from about 0.6 μm to about 1.5 μm.
8. The liquid crystal display assembly of claim 1 wherein:
   the polymeric nematic liquid crystal film has an optical axis splayed out of the plane of the film, liquid crystals in said film having a pretilt angle from about 2° to about 10° and being splayed to an angle of from about 25° to about 90° from the plane at the air surface of the film.
9. An optical compensator comprising:
   an aromatic polyimide-based UV curable acrylate film with a rubbed first surface comprising an alignment layer, said alignment layer providing a defined pretilt to an adjacent polymeric nematic liquid crystal film.
10. The optical compensator of claim 9 wherein:
    said optical compensator includes a transparent substrate with a second surface of said aromatic polyimide-based UV curable acrylate film on said substrate.
11. The optical compensator of claim 10 wherein:
    the substrate is a film of triacetyl cellulose.
12. The optical compensator of claim 9 wherein:
    the aromatic polyimide-based UV curable acrylate film has a thickness ranging from about 0.3 to about 10 μm.
13. The optical compensator of claim 9 wherein:
    the aromatic polyimide-based UV curable acrylate film exhibits a negative birefringence and functions as a uniaxial negative birefringent C-plate.
14. The optical compensator of claim 9 wherein:
    the polymeric nematic liquid crystal film is formed from polymerizable liquid crystal material dissolved in a solvent, said solvent mixture being applied to the alignment surface of the aromatic polyimide-based UV curable acrylate film.
15. The optical compensator of claim 9 wherein:
    the polymeric nematic liquid crystal film functions as an element selected from the group consisting of an A-plate, an O-plate, a splayed O-plate, a splayed twisted film and a chiral film.
16. The optical compensator of claim 9 wherein:
    the thickness of said aromatic polyimide-based acrylate film is greater than 0.3 μm and said polymeric nematic liquid crystal film functions as an A-plate for use in a vertically aligned liquid crystal display or a liquid crystal projector.
17. The optical compensator of claim 9 wherein:
    the thickness of said aromatic polyimide-based acrylate is less than 0.3 μm and said polymeric nematic liquid crystal film functions as an A-plate for use in a super twisted nematic liquid crystal display or a liquid crystal projector.
18. The optical compensator of claim 9 wherein:
    said polymeric nematic liquid crystal film functions as an element selected from the group consisting of an O-plate, a splayed O-plate, and a splayed twisted O-plate for use in a twisted nematic liquid crystal display.
19. The optical compensator of claim 9 further comprising:
    a transparent substrate; and
    multiple layers of an aromatic polyimide-based UV curable acrylate film, each of said multiple layers of the aromatic polyimide-based UV curable acrylate film providing a defined pretilt to an adjacent polymeric nematic liquid crystal film, said optical compensator being adapted for use in conjunction with a display selected from the group consisting of a twisted nematic liquid crystal display, a vertically aligned liquid crystal display, an electrically controlled birefringence liquid crystal display, and an in-plane liquid crystal switching display.
20. An optical compensator comprising an aromatic polyimide-based UV curable acrylate film wherein the aromatic polyimide-based UV curable acrylate film functions as a uniaxial negative birefringent C-plate.
21. The optical compensator of claim 20 wherein:
    the optical compensator is used in conjunction with a display selected from the group consisting of a twisted nematic liquid crystal display and a vertically aligned liquid crystal display.
22. A layered assembly comprising an aromatic polyimide-based UV curable acrylate film with a rubbed first surface comprising an alignment layer, said alignment layer providing a defined pretilt to an adjacent polymeric chiral nematic liquid crystal film.
23. The layered assembly of claim 22 further comprising:
    a transparent substrate with a second surface of said aromatic polyimide-based UV curable acrylate film on said substrate.

24. The layered assembly of claim 22 wherein:
said layered assembly is used as an apparatus selected from the group consisting of a brightness enhancement film, a color filter or a circular polarizer.

25. The layered assembly of claim 22 wherein the polymeric nematic liquid crystal is doped with a chiral compound to induce twist.

26. A liquid crystal display assembly including an optical compensator comprising an aromatic polyimide-based UV curable acrylate film having first and second parallel surfaces, said first surface comprising an alignment layer provided by rubbing said first surface, and a polymeric nematic liquid crystal film on said alignment layer.

27. The liquid crystal display of claim 26 further comprising:
a transparent substrate in contact with the second surface of the aromatic polyimide-based UV curable acrylate film, the alignment surface of the aromatic polyimide-based UV curable acrylate film providing a pretilt to liquid crystals in the polymeric nematic liquid crystal film.

28. The liquid crystal display assembly of claim 26 wherein:
said aromatic polyimide-based UV curable acrylate film has a thickness greater than about 0.5 μm, said alignment layer providing a defined pretilt in the polymeric nematic liquid crystal, the aromatic polyimide-based UV curable acrylate film functioning as a C-plate compensator.

29. The liquid crystal display assembly of claim 28 wherein:
said polymeric nematic liquid crystal film functions as an A-plate and the liquid crystal display is an apparatus selected from the group consisting of a vertically aligned display, a super twisted nematic display and a liquid crystal projector.

30. The liquid crystal display assembly of claim 28 wherein:
the aromatic polyimide-based UV curable acrylate film functions as a negative birefringent C-plate and the liquid crystal display is selected from the group consisting of a twisted nematic display and a vertically aligned liquid crystal display.

31. The liquid crystal display assembly of claim 26 wherein:
the optical compensator comprises a transparent substrate, multiple layers of an aromatic polyimide-based UV curable acrylate film on said substrate each having a rubbed alignment layer, and multiple polymeric nematic liquid crystal films on the alignment layers, the alignment layers of said multiple layers of the aromatic polyimide-based UV curable acrylate film providing a defined pretilt to adjacent polymeric nematic liquid crystal films.

32. The liquid crystal display assembly of claim 31 wherein:
the liquid crystal display comprises a display selected from the group consisting of a twisted nematic display, a vertically aligned display, an electrically controlled birefringence display and an in-plane liquid crystal switching display.

33. An optical compensator comprising an aromatic polyimide-based UV curable acrylate film having a negative birefringence with the primary symmetry normal to the surface of the film.

34. An optical compensator comprising an aromatic polyimide-based UV curable acrylate wherein the aromatic polyimide-based UV curable acrylate film functions as a negative birefringent C-plate and the optical compensator is used in conjunction with a twisted nematic liquid crystal display or a vertically aligned liquid crystal display.

35. A device comprising an electronically controlled screen display including an aromatic polyimide-based UV curable acrylate compensator film or an aromatic polyimide-based UV curable acrylate alignment film used in conjunction with at least one nematic liquid crystal-based compensator film.

36. An apparatus comprising a layer of an aromatic polyimide-based UV curable acrylate material rubbed to produce planar alignment with pretilt in a polymeric nematic liquid crystal material.

37. The apparatus of claim 36 wherein the layer of aromatic polyimide-based UV curable acrylate material functions also as a negative birefringent C-plate.

38. The apparatus of claim 36 wherein the layer of aromatic polyimide-based UV curable acrylate material exhibits an out-of-plane negative, substantially uniaxial birefringence and produces an optical retardation of about 50 nm for each 1 μm of thickness.

39. The apparatus of claim 36 wherein the layer of aromatic polyimide-based UV curable acrylate material is at least about 0.3 μm thick.

40. The apparatus of claim 36 wherein the aromatic polyimide-based UV curable acrylate is an alignment layer in a polymeric nematic liquid crystal material compensator assembly.

41. The apparatus of claim 40 wherein the compensator assembly is selected from the group consisting of an A-plate compensator, an O-plate compensator, a splayed O-plate compensator and a splay/twist O-plate compensator.

42. The apparatus of claim 36 wherein the polymeric nematic liquid crystal material functions as an O-plate or a splayed O-plate in a twisted nematic liquid crystal display.

43. The apparatus of claim 36 wherein the liquid crystal material is a cholesteric liquid crystal material provided by chiral doping of a nematic liquid crystal and provides brightness enhancement for a liquid crystal display.

44. An apparatus comprising a layer of an aromatic polyimide-based UV curable acrylate material having a negative birefringence and an optical symmetry axis normal to a surface of the layer, said apparatus including a polymerized nematic liquid crystal layer.

45. The apparatus of claim 44 wherein the layer of said aromatic polyimide-based UV curable acrylate material has a thickness sufficient to function as a negative C-plate optical compensator in conjunction with a liquid crystal display.

46. An apparatus comprising a non-aqueous soluble substrate with a polymerized film formed from an aromatic polyimide-based UV curable acrylate material on the non-aqueous soluble substrate, the polymerized film functioning as a compensator or alignment layer for a polymerized nematic liquid crystal film.

47. A device including an electronically controlled liquid crystal display comprising a compensator assembly including an aromatic polyimide-based UV curable acrylate alignment film.

48. The device of claim 47 wherein said device is selected from the group consisting of a television screen, a television monitor, a cell phone display, a lap top computer display screen, a portable computer display screen, a desk top computer display screen, a digital camera display, a panel display, a liquid crystal electro-optical device, a beam steering optics device and a wavefront correction device.

49. A liquid crystal display assembly comprising:
- a polarizer adjacent to a lighting source, said polarizer having an oriented absorption axis;
- a viewer side analyzer having an absorption axis substantially perpendicular to the oriented absorption axis of the polarizer adjacent to the lighting source;
- a liquid crystal cell comprising a twisted nematic liquid crystal material between the polarizer and the analyzer; and
- at least one compensator assembly located between the polarizer and the analyzer, the at least one compensator comprising:
  - an aromatic polyimide-based UV curable acrylate film with a first surface rubbed to create an alignment layer; and
  - a polymeric nematic liquid crystal film on the alignment surface of the rubbed aromatic polyimide-based UV curable acrylate film, said rubbed aromatic polyimide-based UV curable acrylate layer causing a pretilt in the polymerized nematic liquid crystal film,
- wherein the compensator assembly includes a TAC substrate, a second surface of the aromatic polyimide-based UV curable acrylate film being in contact with said substrate, the aromatic polyimide-based UV curable acrylate film having a thickness from about 0.5 μm to about 10 μm, the TAC substrate having substantially no in-plane retardance and a negative out-of-plane retardance from about 30 nm to about 120 nm.

50. The liquid crystal display assembly of claim 49 wherein the aromatic polyimide-based acrylate alignment layer comprises:
- an acrylate photopolymer; and
- an aromatic polyimide material mixed with said acrylate photopolymer.

51. The liquid crystal display assembly of claim 49 wherein:
- at least one compensator assembly is located between the polarizer and the liquid crystal cell; and
- a second compensator assembly is located between the analyzer and the liquid crystal cell.

52. The liquid crystal display assembly of claim 49 wherein:
- the aromatic polyimide-based UV curable acrylate layer has a thickness greater than about 0.5 μm.

53. The liquid crystal display assembly of claim 49 wherein:
- the aromatic polyimide-based UV curable acrylate layer has a thickness from about 0.5 μm to about 10 μm.

54. The liquid crystal display assembly of claim 49 wherein:
- said aromatic polyimide-based UV curable acrylate layer also functions as a negative uniaxial birefringent C-plate.

55. The liquid crystal display assembly of claim 49 wherein:
- the polymeric nematic liquid crystal film has a thickness ranging from about 0.6 μm to about 1.5 μm.

56. The liquid crystal display assembly of claim 49 wherein:
- the polymeric nematic liquid crystal film has an optical axis splayed out of the plane of the film, liquid crystals in said film having a pretilt angle from about 2° to about 10° and being splayed to an angle of from about 25° to about 90° from the plane at the air surface of the film.

* * * * *